(12) United States Patent
Persson et al.

(10) Patent No.: US 11,420,569 B2
(45) Date of Patent: Aug. 23, 2022

(54) FLEXIBLE LIGHT BLOCKING ELEMENT

(71) Applicant: VEONEER SWEDEN AB, Vargarda (SE)

(72) Inventors: Madeleine Persson, Linköping (SE); Vincent Lingered, Linköping (SE)

(73) Assignee: VEONEER SWEDEN AB, Vargarda (SE)

(*) Notice: Subject to any disclaimer, the term of this patent is extended or adjusted under 35 U.S.C. 154(b) by 160 days.

(21) Appl. No.: 16/772,614

(22) PCT Filed: Dec. 6, 2018

(86) PCT No.: PCT/EP2018/083765
§ 371 (c)(1),
(2) Date: Jun. 12, 2020

(87) PCT Pub. No.: WO2019/115336
PCT Pub. Date: Jun. 20, 2019

(65) Prior Publication Data
US 2020/0391671 A1 Dec. 17, 2020

(30) Foreign Application Priority Data
Dec. 12, 2017 (EP) .................... 17206723

(51) Int. Cl.
B60R 11/04 (2006.01)
G03B 17/56 (2021.01)
B60R 11/00 (2006.01)

(52) U.S. Cl.
CPC .......... B60R 11/04 (2013.01); G03B 17/565 (2013.01); B60R 2011/0026 (2013.01)

(58) Field of Classification Search
CPC ............ B60R 11/04; B60R 2011/0026; G03B 17/565
USPC ......................................................... 348/148
See application file for complete search history.

(56) References Cited

U.S. PATENT DOCUMENTS 9,961,242 B2    5/2018  Oh
2016/0227078 A1* 8/2016  Oh .................. G03B 17/55
2017/0152644 A1* 6/2017  Nickodemus ........... F41H 5/023

FOREIGN PATENT DOCUMENTS

EP    3054348 A1    8/2016
WO    2007/091247 A1    8/2007

OTHER PUBLICATIONS

International Search Report and Written Opinion of PCT/EP2018/083765, dated Jan. 2, 2019.

* cited by examiner

Primary Examiner — Allen C Wong
(74) Attorney, Agent, or Firm — Dickinson Wright PLLC

(57) ABSTRACT

A light blocking element (5) for an imaging system (1) for a motor vehicle including a bottom section (6), a left wall section and a right wall section (8), the wall sections (8) extending from an opening (12) for reception of a camera lens (4) between the wall sections (8), the wall sections (8) being attached to the bottom section (6) at a first end (9), the wall sections' second end (13) being adapted to be attached to a motor vehicle windshield (2). The wall sections (8) being elastically deformable.

17 Claims, 3 Drawing Sheets

FLEXIBLE LIGHT BLOCKING ELEMENT

CROSS-REFERENCE TO RELATED APPLICATIONS

This application is a 35 U.S.C. § 371 national phase of PCT International Application No. PCT/EP2018/083765, filed Dec. 6, 2018, which claims the benefit of priority under 35 U.S.C. § 119 to European Patent Application No. 17206723.3, filed Dec. 12, 2017, the contents of which are incorporated herein by reference in their entirety.

FIELD OF THE INVENTION

The invention relates to an imaging system for a motor vehicle.

BACKGROUND

Imaging systems for a motor vehicle that are used for imaging and monitoring the conditions ahead of the vehicle are often disposed at a portion which is the inner surface of a windshield of the motor vehicle. The imaging system has to be correctly mounted at a predetermined position on the windshield to image the conditions ahead of the vehicle. Preferred is a position in the area of a rearview mirror to avoid limitation of the field of view of a vehicle driver. To minimize installation space of the imaging system it is preferred that a camera lens is positioned close to the windshield, which is usually arranged in a tilted angle. To avoid background reflections, a phenomenon where the light from the inside of the vehicle is reflected by the inner surface of the windshield, thereby entering the camera, a light blocking element is provided sealing the space between the camera lens and the windshield.

In the assembly process of an imaging system for a motor vehicle, the camera module is usually aligned regarding roll angle, tilt angle and yaw angle to avoid deterioration of the image quality. Therefore, attachment brackets are provided, which are to be attached to the windshield. Usually, the camera housing is attached to the brackets and a separate light blocking element is attached to the housing.

During production, it is advantageous to mount and assemble as many components as possible before final assembly of the motor vehicle. Therefore, the attachment components of the imaging system are pre-mounted to the windshield at the windshield supplier and transported to the motor vehicle assembly plant. The windshields are stacked during transport. Therefore, the stacking height is limited and pre-mounted components should consume low stacking height to save space. Usually, camera brackets are pre-mounted, to which camera housing and light blocking element are fixed during assembly. Prior art solutions are mostly directed on reducing the size of the attachment to match the stacking height limit. A pre-mountable light blocking element would also have to match the stacking height limit. However, the light blocking element has to cover the camera lens, when the imaging system is completely assembled, and the lens diameter may be wider than the stacking height. It is therefore difficult to provide a light blocking element that is large enough for the lens diameter but small enough to manage the stacking height limit.

The problem underlying the present invention is to provide an in-vehicle imaging system with an improved light blocking element improving the pre-mounting process of the imaging system to a windshield of a motor vehicle.

SUMMARY AND INTRODUCTORY DESCRIPTION OF EMBODIMENTS OF THE INVENTION

Embodiments of the present invention solves the above-described object with the features described in the figures and the related description.

According to the basic idea of the invention it is suggested that a light blocking element for an imaging system for a motor vehicle includes a bottom section, a left wall section and a right wall section. The wall sections extend from an opening for reception of a camera lens between the wall sections and are attached to the bottom section at a first end. The second end of the wall sections is adapted to be attached to a vehicle windshield. The wall sections may be elastically deformable.

The advantage of an embodiment according to the invention is that a light blocking element is provided that is large enough for the lens diameter of a camera of the imaging system but small enough to match the stacking height limit for transporting the windshields from the windshield supplier to the motor vehicle construction site. The bottom surface of the light blocking element has a substantially trapezoidal shape, due to the field of view of the camera lens, with a narrow rear end, where the lens is located in the assembled state of the imaging system. The side wall sections extend at their first end along the bottom section. The height of the side wall sections at the rear end of the light blocking element is adapted to the lens diameter and is decreasing towards the front end of the bottom section to nearly zero. Therefore, in the assembled state of the imaging system, the windshield, the front end of the bottom section and the second end of the wall sections constitute an inner volume. The inner volume is sealed against the inside of the motor vehicle and light can only enter the camera lens through the windshield. With side wall sections that are elastically compressible, the height of the side wall sections can be reduced, even if the light blocking element is already pre-mounted. The elastic deformability may be realized with some kind of soft material, e.g. thermoplastic elastomer or silicone rubber. Therefore, the light blocking element can be pushed or compressed or folded to a height smaller than the stacking height limit for transport but expands to be able to enclose the lens when the camera is mounted in the final assembly step. The light blocking element may be compressed and hold in place by a tape that is removed prior to mounting of the camera or it may just be compressed by the weight of the next windshield in a windshield stack and expands when it is removed. Instead, rigid prior art light blocking elements, which are often made from polyamid, may be damaged if load is applied to them.

Furthermore, the light blocking element may include a frame section that is attached to the outer surface of the first end of the wall sections and a front end of the bottom section. In this embodiment the outer contours of the light blocking element, particularly the side wall sections, are stabilized and their shape is maintained during compressing of the side wall sections. The frame is preferably located at the outer surface of the side wall sections and the bottom section, therefore, only the soft material is visible from outside the motor vehicle and no visible joints appear in this area.

In a further preferred embodiment, the frame includes first fixation portions at the rear end of the light blocking element, which are adapted for fixating the light blocking element to a camera housing of an imaging system for a motor vehicle. With such fixation portions, mounting of the light blocking element is facilitated. The light blocking element may be fixed to a bracket that is pre-mounted to a windshield, e.g. by glueing. Attaching the light blocking element to the bracket in a predefined position, simultaneously allows precise alignment of the light blocking element to the bracket.

It is further preferred, that the fixation portions include snap-in features. Therefore, the light blocking element becomes detachable and enables easy handling in case of a repair.

Furthermore, it is preferred, that the frame additionally includes second fixation portions at the front end of the frame portion, which are adapted for attachment to the bracket which is glued to a windshield of a motor vehicle. It is preferred to attach the light blocking element by snap-in to the bracket. Alternatively, the frame may be attached to the camera housing.

According to embodiments of the invention, the light blocking element may include wall sections and bottom section made of an elastically deformable material to increase the deformability. In an alternative embodiment, the bottom section is made of an inelastic, rigid material, e.g. thermoplastic material. This increases the stability of the bottom section, while the deformability of the side wall section is maintained.

In an alternative embodiment, it is preferred, that the wall sections and the bottom section are made of an elastically deformable material and the side wall sections further include attachment sections at their first end, which is their upper end, that are adapted to be attached to a windshield of a motor vehicle. Attachment of such a frame-less, totally soft light blocking element differs in that the light blocking element is not mounted to a bracket or a camera housing of the imaging system, but separately to the windshield. The attachment sections extend at the upper end of the side wall sections and build contact surfaces to the windshield. It is preferred, that the attachment sections are adapted to be attached by an adhesive to a windshield of a motor vehicle. This embodiment has production advantages, since it can be built in one step from the same soft material, but is not easily detachable in its mounted state.

The light blocking element is preferably part of an imaging system, that further includes a bracket to be attached to an inner surface of a windshield of a motor vehicle and a camera housing. Furthermore it is preferred, that such an imaging system is part of a motor vehicle.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
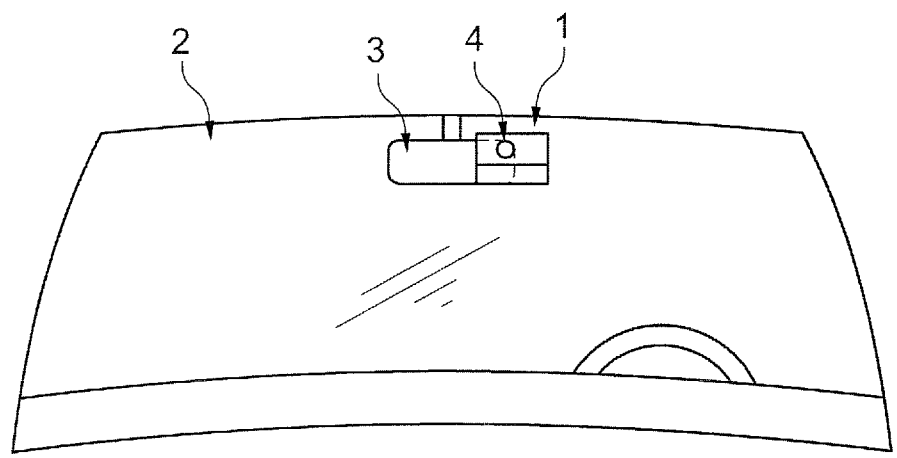
FIG. 1 shows a schematic view of an example of a mounting position of the imaging system at the windshield of a motor vehicle.

In the embodiment shown in FIG. 1, the imaging system 1 is disposed at a portion of the inner surface of the windshield 2 and behind the rearview mirror 3. In this configuration a camera is directed to the front side of the motor vehicle, which is the forward direction into which the motor vehicle usually moves. It is to be noted, that the term front side is consistently used in this manner in the description, as the same applies accordingly to the terms rear, bottom and top side.

The imaging system 1 may be used for imaging conditions ahead of the motor vehicle and correctly detecting the positions of for example lane markers, traffic lights, traffic signs, presence of oncoming vehicles and vehicles running ahead of the camera. Therefore, it is required to correctly attach the imaging system 1, so that the camera lens 4 is fixed and aligned.

Figure 2A:
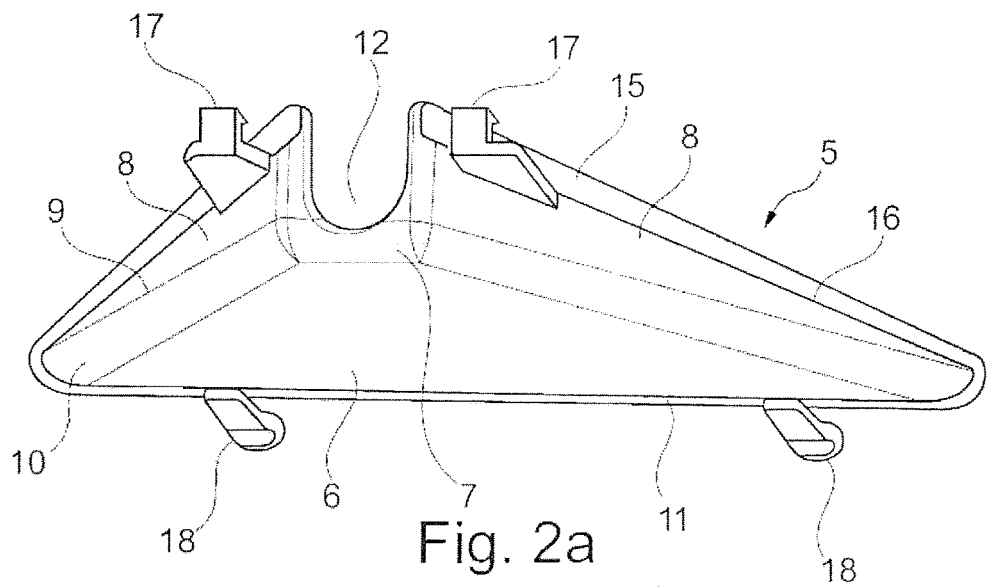
FIGS. 2*a-c* shows a schematic view of an embodiment of the present invention in a rear bottom view (a), a front view (b) and a left side view (c)
Figure 2B:
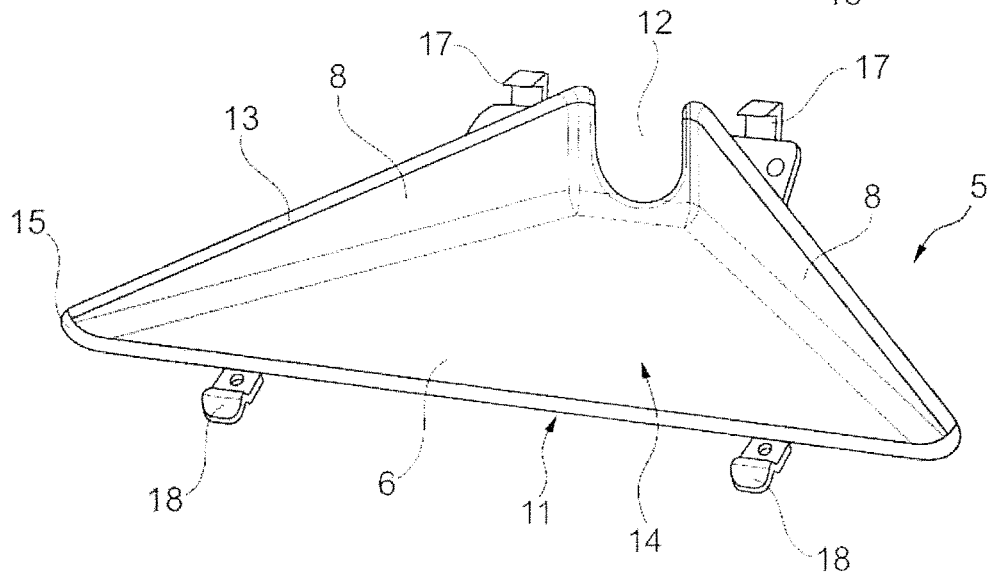
Figure 2C:
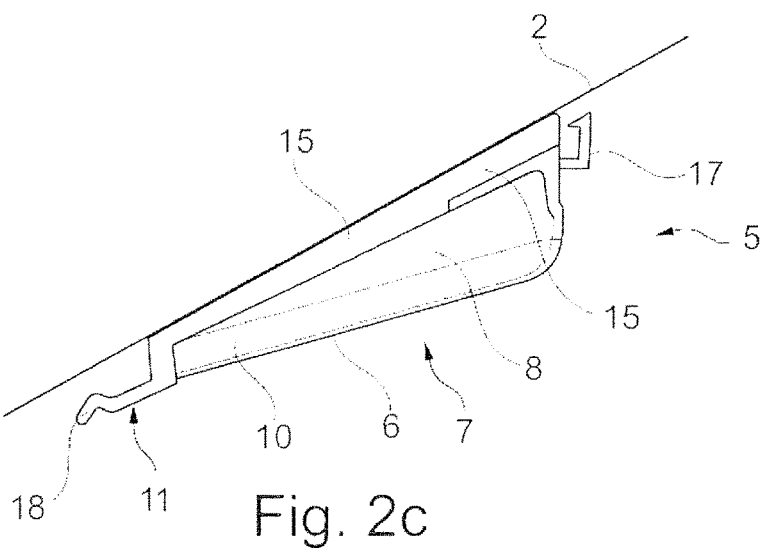

The basic structure of a light blocking element 5 is shown in FIG. 2*a-c*. A bottom section 6 of the light blocking element 5 has a substantially trapezoidal shape, due to the field of view of the camera lens 4, with a narrow rear end 7, where the lens 4 is located in the assembled state of the imaging system 1. At its left and right ends, side wall sections 8 extend upwards. At the first ends 9, which are the bottom ends, the side wall sections 8 are connected with the bottom section 6. In a possible embodiment with bottom section 6 and side wall sections 8 made from the same material, the sections may be constructed in one step without visible joints at their ends. In this case a curved transition section 10 may be established, due to design efforts. Furthermore sharp edges in the interior of a motor vehicle are avoided. The front end 11 of the bottom section 6 is abutting the windshield 2 in the assembled state of the imaging system 1. At the rear end 7 of the bottom section 6 a substantially U-formed opening 12 is established for reception of the camera lens 4 in the assembled state of the imaging system 1. The height of the lens opening 12 has to be adapted to the diameter of the associated camera lens 4. The side wall sections 8 directly abut to the lens opening 12. Therefore, the height of the wall sections has also to be adapted to the diameter of the camera lens 4. The height of the side wall sections 8 decreases towards the front end 11 of the bottom section 6 to nearly zero. In the assembled state of the imaging system 1, the windshield 2, the front end 11 of the bottom section 6 and the second end 13 (upper end) of the wall sections 8 constitute an inner volume 14 (shown in FIG. 2*c*). The inner volume 14 is sealed against the interior of the motor vehicle and light can only enter the camera lens 4 through the windshield 2. The surface of the inner volume 14 may be coated or roughed to eliminate unwanted light reflections and to increase the functionality of the imaging system 1.

In this embodiment, a frame section 15 is attached to the first end 9 of the wall sections 8 and the front end 11 of the bottom section 6. The outer contours of the light blocking element 5, particularly the side wall sections 8, are stabilized and their shape is maintained during compressing of the side wall sections 8, when windshields 2 are stacked. The frame section 15 is preferably located at the outer surface 16 of the side wall sections 8 and the bottom section 6, therefore, only the soft material is visible from outside the motor vehicle and no visible joints appear in this area of the inner volume 14.

At the rear end 7 of the light blocking element 5, the frame includes first fixation portions 17. The first fixation portions 17 are adapted for fixating the light blocking element 5 to a camera housing or bracket of an imaging system 1. The light blocking element 5 may be fixed to a bracket that is pre-mounted to a windshield 2. The first fixating portions 17 may have a hook-like design or may be provided in the form of snap-in features to allow for a detachable mounting. But also other possible connections are subject of this invention, as they allow for a connection and fixation of the light blocking element 5 to the imaging system 1.

The embodiment shown in FIGS. 2a-c additionally includes second fixation portions 18 at the front end 11 of the frame section 15, which are adapted for attachment to a bracket which is glued to a windshield 2. The second fixation portions 18 may be attached to the bracket by snap-in. Alternatively, the frame section 15 is attached to the camera.

It is mandatory for the functionality of the pre-mountable light blocking element 5 that the wall sections 8 are made of an elastically deformable material. Therefore, when the windshields 2 are stacked, the side wall sections 8 are pushed or compressed or folded to a height smaller than the stacking height limit for transport but can expand to be able to enclose the camera lens 4 when the camera is mounted in the final assembly step. The light blocking element 5 may be compressed and hold in place by a tape (not shown) that is removed prior to mounting of the camera lens 4 or it may just be compressed by the weight of the next windshield 2 in a windshield stack and expands when the windshield is removed.

The bottom section 6 may also be made of an elastically deformable material, e.g. thermoplastic elastomer or a rubber-like material. Therefore, production becomes easier, since bottom section 6 and side wall sections 8 can be produced in the same step. But the bottom section 6 may also be made of an inelastic, rigid material, e.g. polyamide. This may increase the stability of the bottom section 6, while the deformability of the side wall sections 8 is maintained. When the side wall sections 8 are deformed during stacking of the windshields 2, the rigid bottom section 6 simply follows the compression of the side wall sections 8 and expands upwards, thereby reducing the total height of the light blocking element 5.

Figure 3A:
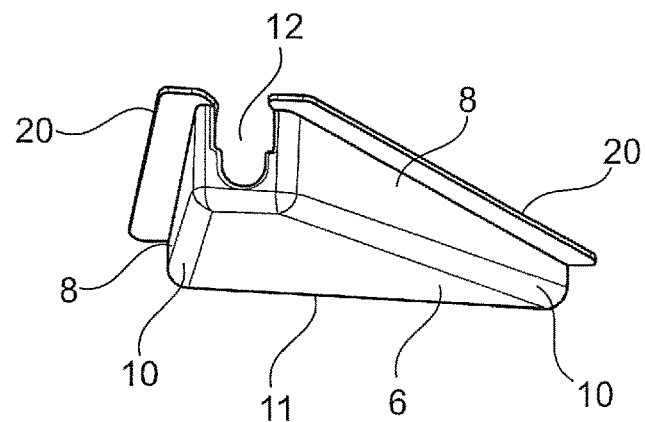
FIGS. 3*a-c* shows a schematic view of an alternative embodiment of the present invention in a rear bottom view (a), a front view (b) and a left side view (c).
Figure 3B:
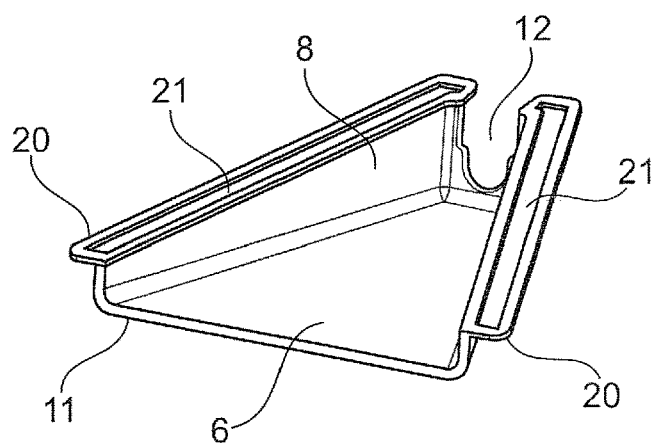
Figure 3C:
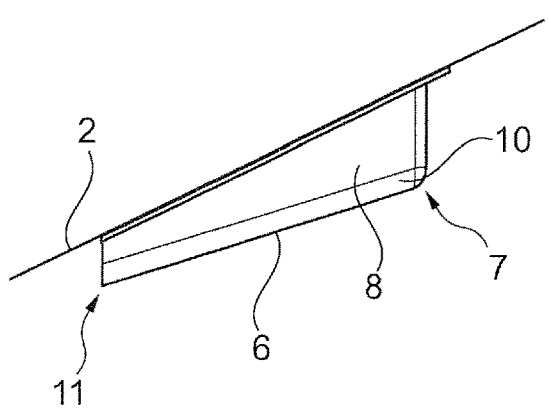

The alternative embodiment of a light blocking element 5', shown in FIGS. 3a-c, is different in that no frame section 15 is provided and therefore, the attachment to the windshield 2 is realized in a different way. The light blocking element 5' consists mainly of the same parts, i.e. bottom section 6, side wall sections 8 and camera lens opening 12. The side wall sections 8 include attachment sections 20 at their first end 9. The attachment sections 20 are extending alongside the first ends 9 and are extending outwardly, away from the inner volume 14 of the light blocking element 5'. The attachment sections 20 constitute substantially rectangular contact surfaces 21. The contact surfaces 21 show lowered relative surfaces to be able to contain an adhesive. The contact surfaces 21 and the windshield 2 are stuck together by an adhesive. A light blocking element 5' according to this embodiment is fixed to the windshield 2 and cannot be easily detached. But mounting of the light blocking element 5' becomes independent from the connection provided at the camera housing or other parts of the imaging system 1, since it is directly glued to the windshield 2. Simply the lens opening 12 has to be adapted to the used camera lens 4. In this embodiment, the light blocking element 5' is totally made from an elastically deformable material and it can therefore be built in one production step.

While the above description constitutes the preferred embodiment of the present invention, it will be appreciated that the invention is susceptible to modification, variation and change without departing from the proper scope and fair meaning of the accompanying claims.

The invention claimed is:
1. A light blocking element for an imaging system for a motor vehicle, the imaging system of the type including a camera lens and the light blocking element adapted to be attached to a motor vehicle windshield, the light blocking element comprising,
   a bottom section,
   a left wall section and a right wall section,
   the left and right wall sections extending from an opening for reception of the camera lens between the left and right wall sections,
   the left and right wall sections being attached to the bottom section at a first end,
   the wall sections having a second end being adapted to be attached to the motor vehicle windshield; and
   the left and right wall sections being elastically deformable to allow the left and right wall sections to be compressed.

2. A light blocking element according to claim 1, further comprising a frame section is attached to the outer surface of the first end of the wall sections and a front end of the bottom section.

3. A light blocking element according to claim 2, wherein the frame section comprises first fixation portions at the rear end of the light blocking element, which are adapted for fixing the light blocking element to a camera housing of an imaging system for the motor vehicle.

4. A light blocking element according to claim 3, wherein the first fixation portions comprise snap-in features.

5. A light blocking element according to claim 3, wherein the frame section comprises second fixation portions at the front end of the frame section, which are adapted for attachment to a windshield of the motor vehicle.

6. A light blocking element according to claim 2 further comprising the left and right wall sections are made of an elastically deformable material and the bottom section is made of an inelastic, rigid material.

7. A light blocking element according to claim 2 further comprising the left and right wall sections and the bottom section are made of an elastically deformable material.

8. A light blocking element according to claim 1, further comprising the left and right wall sections and the bottom section are made of an elastically deformable material and further comprising attachment sections at the first end of the left and right wall sections, which are adapted to be attached to the windshield of the motor vehicle.

9. A light blocking element according to claim 8, further comprising the attachment sections are adapted to be attached by an adhesive to the windshield of the motor vehicle.

10. A light blocking element in accordance with claim 1, adapted for use with the imaging system comprising a bracket to be attached to an inner surface of a windshield of the motor vehicle, and a camera housing for the camera lens and camera controls.

11. A motor vehicle with an imaging system according to claim 10.

12. A light blocking element for an imaging system for a motor vehicle, the imaging system of the type including a camera lens and the light blocking element adapted to be attached to a motor vehicle windshield, the light blocking element comprising,
   a bottom section,
   a left wall section and a right wall section,
   the left and right wall sections extending from an opening for reception of the camera lens between the left and right wall sections,
   the left and right wall sections being attached to the bottom section at a first end, the wall sections having a second end being adapted to be attached to the motor vehicle windshield, the left and right wall sections being elastically deformable, and a frame section being attached to an outer surface of the first end of the wall sections and a front end of the bottom section.

13. A light blocking element according to claim 12, wherein the frame section comprises first fixation portions at the rear end of the light blocking element, which are adapted for fixing the light blocking element to a camera housing of an imaging system for the motor vehicle.

14. A light blocking element according to claim 13, wherein the first fixation portions comprise snap-in features.

15. A light blocking element according to claim 13, wherein the frame section comprises second fixation portions at the front end of the frame section, which are adapted for attachment to a windshield of the motor vehicle.

16. A light blocking element according to claim 12 further comprising the left and right wall sections are made of an elastically deformable material and the bottom section is made of an inelastic, rigid material.

17. A light blocking element according to claim 12 further comprising the left and right wall sections and the bottom section are made of an elastically deformable material.

* * * * *